United States Patent Office 3,415,894
Patented Dec. 10, 1968

3,415,894
PROCESS FOR PREPARING HALOGENATED PROPANOLS
Harry L. Yale, New Brunswick, N.J., assignor to E. R. Squibb & Sons, Inc., New York, N.Y., a corporation of Delaware
No Drawing. Filed Mar. 27, 1967, Ser. No. 625,971
4 Claims. (Cl. 260—633)

ABSTRACT OF THE DISCLOSURE

This invention relates to a new process for preparing halogenated propanols, particularly 2,2,3,3,3-pentafluoropropanol. The pentafluoropropanol is prepared by first interacting tetrafluoroethylene with an alkali metal or alkaline earth metal fluoride, followed by reaction with formaldehyde to give $CF_3CF_2CH_2O(Metal)$ and the metal alcoholate is then hydrolyzed with water.

---

Heretofore, 2,2,3,3,3-pentafluoropropanol has been available only by means of a tedious and costly synthesis and in poor yield starting with propionic anhydride. Thus, propionic anhydride in anhydrous liquid hydrogen fluoride at —30° C. is electrolized at 50 amperes and 5.2 volt potential drop to give 2,2,3,3,3-pentafluoropropionyl fluoride, which is hydrolized to 2,2,3,3,3-pentafluoropropionic acid; the acid is recovered from the aqueous solution, purified, and converted to the methyl ester; the methyl ester is then reduced with hydrogen over a suitable catalyst or reduced by means of a reagent like lithium aluminum hydride to 2,2,3,3,3-pentafluoropropanol. All of these steps proceed in only fair yield and the purification of 2,2,3,3,3-pentafluoropropanol obtained in this fashion is difficult.

It has now been found that 2,2,3,3,3-pentafluoropropanol can be prepared by a more direct process. Using tetrafluoroethylene and an alkali metal fluoride or an alkaline earth metal fluoride there occurs first an addition of fluorine to one of the carbon atoms of the tetrafluoroethylene to give presumably an ionic species of the general structure $[CF_3CF_2Metal]^+$; this species can then react with formaldehyde to give $CF_3CF_2CH_2O(Metal)$ and the metal alcoholate is then hydrolyzed to give

$CF_3CF_2CH_2OH$ and metal hydroxide.

This invention, therefore, relates to a new process for preparing halogenated propanols and particularly 2,2,3,3,3-pentafluoropropanol of the formula:

$CF_3CF_2CH_2OH$

The pentafluoropropanol is known and can be used as a refrigerant or as an intermediate for the more halogenated derivatives. Thus, 2,2,3,3,3-pentafluoropropanol can be converted to 2,2,3,3,3-pentafluoro-1-bromo-1-chloropropane, a compound possessing anesthetic properties, by reaction with p-toluenesulfonyl chloride and aqueous alkali to give 2,2,3,3,3-pentafluoropropyl p-toluenesulfonate; the latter is treated with anhydrous lithium chloride in diethylene glycol to give 2,2,3,3,3-pentafluoro-1-chloropropane; and the latter brominated at about 485° C. to give 2,2,3,3,3-pentafluoro-1-bromo-1-chloropropane, a compound possessing anesthetic properties, as described in my application Ser. No. 554,671, filed June 2, 1966.

In accordance with the process of this invention these halogenated propanols are prepared by interacting tetrafluoroethylene ($CF_2=CF_2$) first with an alkali metal fluoride or an alkaline earth metal fluoride, followed by reaction with formaldehyde and then with water.

Among the suitable alkali metal fluorides and alkaline earth metal fluorides may be mentioned lithium fluoride, sodium fluoride, potassium fluoride, rubidium fluoride, cesium fluoride, calcium fluoride, strontium fluoride and barium fluoride. Cesium fluoride is particularly preferred.

The reaction is preferably carried out under pressure, such as in an autoclave, the preferred pressure being about 5 p.s.i.g. to about 25 p.s.i.g. Although any temperature can be used, to increase the speed of reaction an elevated temperature, such as one of about 60° C. to about 150° C., is used.

The following examples illustrate the invention (all temperatures being in centigrade):

EXAMPLE 1

2,2,3,3,3-pentafluoropropanol

Cesium fluoride, 152 g., is slurried in 200 g. of purified triethyleneglycol dimethyl ether in a stirred pressure vessel. To the agitated slurry is added tetrafluoroethylene [freed of its terpene stabilizer by passage through silica gel just before entering the reaction vessel] until the pressure recorded is 10 p.s.i.g. The mixture is stirred for one hour and the stirring continued while 30 g. of gaseous formaldehyde is introduced slowly. Subsequently, the mixture is heated slowly to 100° and maintained at 100° for about five hours during which time the pressure inside the vessel slowly drops to ca. 5 p.s.i.g. The contents of the reaction vessel are cooled and 25 ml. of water is added slowly to the reaction mixture. The hydrolyzed mixture is then heated to distil about 130 g. of 2,2,3,3,3-pentafluoropropanol, B.P. 81–83°.

EXAMPLE 2

Following the procedure of Example 1 but substituting 105 g. of rubidium fluoride for the cesium fluoride in Example 1, the same compound is obtained.

EXAMPLE 3

Following the procedure of Example 1 but substituting 176 g. of barium fluoride for the cesium fluoride in Example 1, the same compound is obtained.

The invention may be variously otherwise embodied within the scope of the appended claims.

What is claimed is:

1. A process for preparing 2,2,3,3,3-pentafluoropropanol which consists essentially of interacting tetrafluoroethylene with an alkali metal or alkaline earth metal fluoride in a triethylene glycol dimethyl ether solvent, then with formaldehyde at a temperature in the range of about 60° C. to about 150° C. and a pressure of about 5 p.s.i.g. to about 25 p.s.i.g., and finally with water.

2. The process of claim 1, wherein the metal fluoride is cesium fluoride.

3. The process of claim 1, wherein the metal fluoride is rubidium fluoride.

4. The process of claim 1, wherein the metal fluoride is barium fluoride.

References Cited

UNITED STATES PATENTS

2,992,276    7/1961    Weinmayr _____ 260—633 XR

LEON ZITVER, *Primary Examiner.*

H. T. MARS, *Assistant Examiner.*